(12) United States Patent
Wodicka, III

(10) Patent No.: US 11,952,185 B1
(45) Date of Patent: Apr. 9, 2024

(54) SYSTEM AND METHOD FOR A SPREADER FOR FOODSTUFF

(71) Applicant: Emil Phillip Wodicka, III, APO, AE (US)

(72) Inventor: Emil Phillip Wodicka, III, APO, AE (US)

( * ) Notice: Subject to any disclaimer, the term of this patent is extended or adjusted under 35 U.S.C. 154(b) by 0 days.

(21) Appl. No.: 18/353,030

(22) Filed: Jul. 14, 2023

Related U.S. Application Data

(60) Provisional application No. 63/458,442, filed on Apr. 11, 2023.

(51) Int. Cl.
*A47J 43/28* (2006.01)
*B65D 51/24* (2006.01)

(52) U.S. Cl.
CPC .......... *B65D 51/246* (2013.01); *A47J 43/288* (2013.01)

(58) Field of Classification Search
CPC .... A47J 43/288; A47G 21/005; B65D 51/246
See application file for complete search history.

(56) References Cited

U.S. PATENT DOCUMENTS

| | | | | |
|---|---|---|---|---|
| 1,324,682 A * | 12/1919 | McIntyre | ............. | B65D 51/246 229/401 |
| 2,106,313 A * | 1/1938 | Amrine | ................ | A47G 19/186 401/128 |
| 2,294,096 A * | 8/1942 | Rice | ..................... | A47G 21/005 15/236.01 |
| 5,291,992 A * | 3/1994 | Olivetti | ................. | A47J 43/288 206/229 |
| 8,079,488 B2 * | 12/2011 | Darflinger | ............ | B65D 51/246 206/541 |
| 9,027,194 B2 * | 5/2015 | Silva | ..................... | A47J 43/288 D7/688 |
| 10,376,080 B1 * | 8/2019 | Newland | ............ | B65D 43/0231 |
| 2011/0191975 A1 * | 8/2011 | Genatossio | ........... | A47J 43/288 15/245.1 |
| 2012/0285845 A1 * | 11/2012 | Jackson | ............... | B65D 77/245 206/223 |
| 2014/0202917 A1 * | 7/2014 | Erlebach | .............. | B65D 51/246 206/553 |
| 2018/0362228 A1 * | 12/2018 | Jacobson | ............... | B65D 51/24 |
| 2021/0298501 A1 * | 9/2021 | Condurso | .............. | B65D 51/32 |
| 2023/0083405 A1 * | 3/2023 | Davis | ................... | B65D 51/246 220/212 |

OTHER PUBLICATIONS

English translation of Korean patent KR 2014-0001892 (Year: 2014).*

* cited by examiner

*Primary Examiner* — Dean J Kramer
(74) *Attorney, Agent, or Firm* — Christopher Mayle

(57) ABSTRACT

A system and method for using a spreader device that is connected to the inside of a foodstuff jar. Once the lid is removed, the user can easily access the spreader without requiring additional cleaning or storage efforts and apply the foodstuff by grasping the lid. The ensures a cleaner, more hygienic, and convenient spreading experience for users.

10 Claims, 3 Drawing Sheets

SYSTEM AND METHOD FOR A SPREADER FOR FOODSTUFF

CROSS REFERENCE TO RELATED APPLICATIONS

This application claims priority to U.S. Provisional Patent No. 63/458,442 filed on Apr. 11, 2023, which is incorporated in its entirety.

BACKGROUND

Spreadable food products, such as nut butter and fruit jam, require the use of a tool for applying them onto desired surfaces. This tool, known as a spreading device, usually in the form of a knife, is distinct from the jar and requires cleaning prior to being stored again. Placing the spreading device inside the foodstuff jar results in it being coated with foodstuff, making it difficult to handle without mess. Furthermore, storing the spreading device separately from the jar adds inconvenience and increases the likelihood of misplacing the spreader. The market offers a wide range of foodstuff jars and lids in various shapes and sizes, but there is currently no standardized industry size for foodstuff storage. Thus exists the need for a universal solution for seamlessly integrating a foodstuff spreader with a jar.

SUMMARY

The present invention seeks to solve this problem by providing a silicone spreader that may be attached to the lid of most spreadable foodstuff containers. Attaching the spreader to the lid allows the user to cleanly spread the contents and store the spreader in the container. Integrating the spreader within the container simplifies the spreading process, as users can effortlessly access the spreader whenever needed, without searching for a separate tool.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limits include both numbers. For example, "25 to 100" means a range whose lower limit is 25 and upper limit is 100 and includes both 25 and 100.

Figure 1:
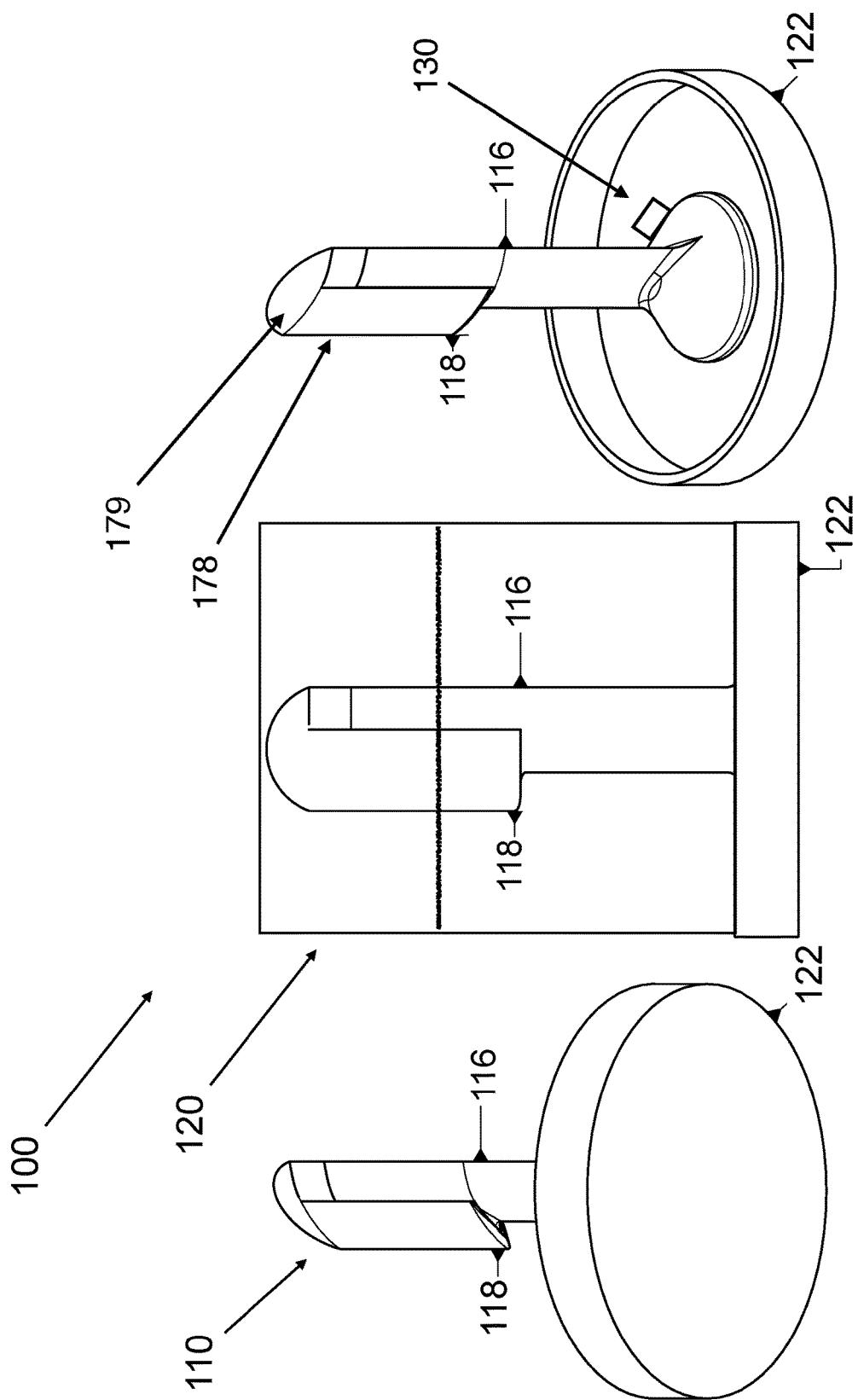
FIG. 1 shows an embodiment of food spreading system.
Figure 2:
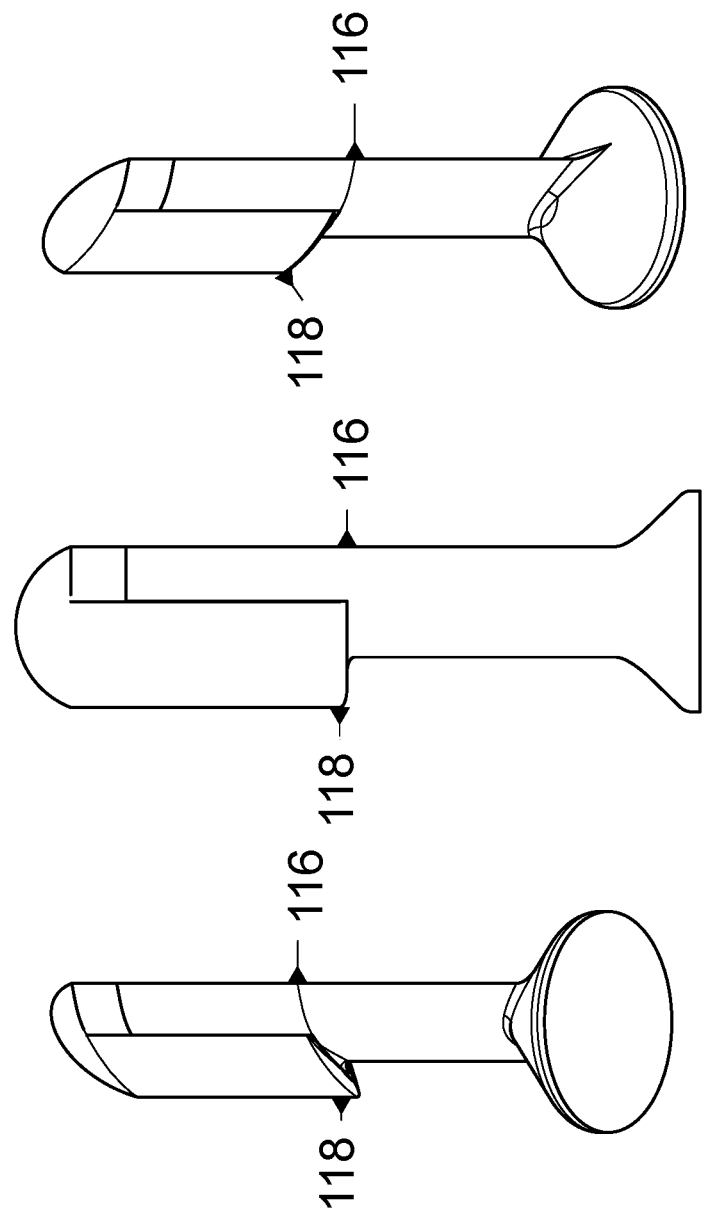
FIG. 2 displays the outside of the spreader of food spreading system when it is not attached to a lid of the container.
Figure 3:
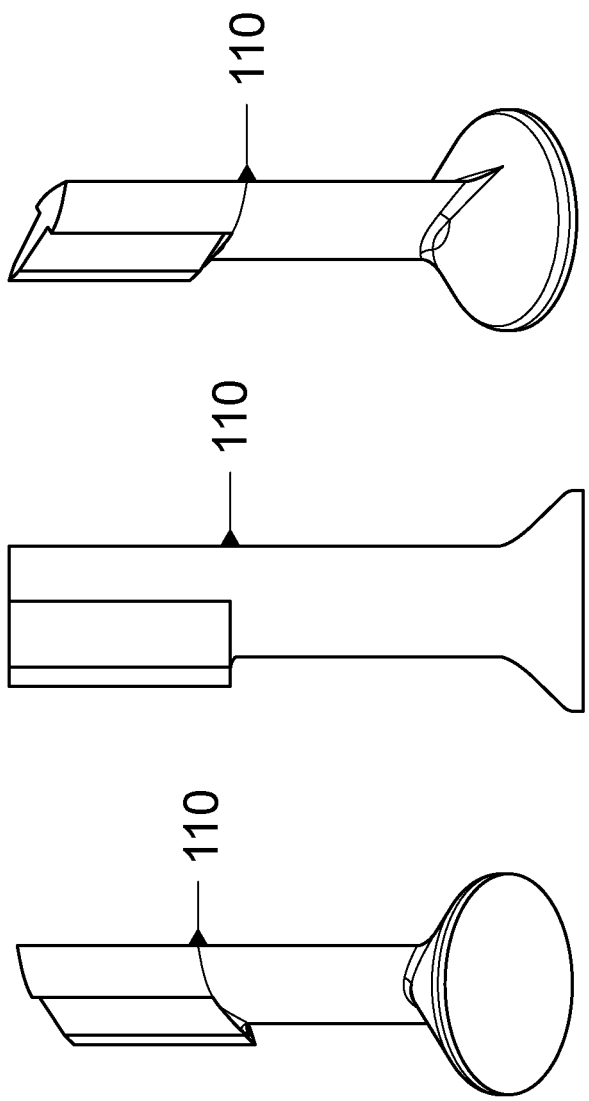
FIG. 3 displays the plastic support base without the spreader.

FIG. 1-3 show an illustration of one embodiment of food spreading system 100 in accordance with the present invention. Food spreading system 100 may include a spreader 110 and a container 120 whereby spreader 110 may be strategically positioned within container 120, allowing easy access and preventing interference with the foodstuff contents whereby spreader 110 may be attached to any conventional lid of a container. This design ensures that spreader 110 remains clean and hygienic, eliminating the need for proprietary lids and containers.

Container 120 may be a cylindrical or rectangular container with a base whereby when placed on a support, the base comes into contact with the supporting surface. Container 120 as a whole, is generally symmetric about a vertical axis passing through the middle of container 120 perpendicular to the base and the supporting surface.

A sidewall portion extends upward from an upper margin of the base. The sidewall portion then extends upward into an opening surrounded by a neck portion on an exterior of container 120. The neck portion is adapted to seal with a lid 122 which is conventionally secured to the neck portion by one or more corresponding threads. Container 120 may be used for securing and preserving spreads, fruits, vegetables, and homemade preserves. Container 120 may be made of glass, plastic, or ceramic, or other materials that do not stray from the present invention. Container 120 come in various shapes, sizes, and designs, catering to different storage needs and aesthetic preferences.

In one or more embodiments foam tape 130 may be used to attach spreader 110 to the underside of lid 122. However, this is non-limiting and spreader 110 may be connected or fastened to the underside of lid 122 whereby the base acts as a suction cup having a concave suction face. The shape of suction cup allows air trapped between the suction and the lid is attached to be expelled, creating a low-pressure area. As the air is expelled, the pressure inside suction cup decreases, causing the higher atmospheric pressure outside the cup to push it against the surface, creating a seal. Also, any method known by those of ordinary skill in the art such as but not limited to screws, Velcro®, pressure or snap fit, clips, buckles, nuts and bolts, suction devices, latches, hinges, or any other type of fasteners.

In one or more non-limiting embodiments, spreader 110 may have a flag shape that allows it to scrape contents from container 120. The flag shape may be defined by a main body 116. Main body 116 may have a longitudinal length, extending a predetermined distance along said longitudinal length from a top end to a conical frustum shape top end or enlarged base. Main body 116 may be connected to a spreading component 118 that is a protrusion at one end opposite of the top end and extending a predetermined distance therefrom forming a hemispherical bottom end 179 whereby a portion or half of the hemispherical bottom 179 is positioned over main body 116 and the other half of hemispherical bottom 179 may extend upward into a generally rectangular section 178 which is adjacent to main body 116. Spreading component 118 may be the component of spreader 110 that interacts with foodstuff during retrieval from container 120 and spreading of the foodstuff. Spreading component 118 may be made of durable and food-safe material such as silicone, designed in a shape that facilitates easy spreading of the foodstuff onto desired surfaces while allowing the tip of spreading component 118 to bend, permitting lid 122 to be secured over the opening of container 120.

The length of the stiffening main body 116 does not fully span the entire length of spreader 110 which allows the tip of the spreader 110 to bend when it is forced against the bottom of container 120. Main body 116 may be made of a rigid material such as but not limited to plastic which provides an adequate surface for foam tape 130 to adhere spreader 110 to lid 122.

During use, the user opens container 120 by removing lid 122, revealing spreader 110. The user then grasps lid 122. The user applies the spreadable food product onto desired surfaces using spreader 110. After usage, lid 122 may be securely reattached to container 120 for convenient storage until the next use.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A food spreading system comprising:
    a spreader configured to be directly attached to an underside flat surface of any lid of a container, wherein the spreader has a main body with a longitudinal length, extending a predetermined distance along said longitudinal length from a bottom end to a conical frustum shape top end, wherein the main body narrows in width from a wider section to a narrow section at a bottom of the main body such that a flexible spreading component is attached to the narrow section at the bottom end extending a distance away from the main body in a sideways direction and is directly below the wider section permitting the flexible spreading component to bend such that the spreader is secured inside the container.

2. The food spreading system of claim 1, wherein the lid is attached to the spreader by foam tape.

3. The food spreading system of claim 1, wherein the flexible spreading component is made of silicone.

4. The food spreading system of claim 1, wherein the lid is attached to the spreader by suction cup at base of the spreader.

5. A food spreading system comprising:
    a spreader configured to be directly connected to an underside of a lid of a container, wherein the spreader has a main body with a longitudinal length, extending a distance along said longitudinal length from a bottom end to a conical frustum shape top end wherein a protrusion is attached at the bottom end extending a distance from the main body, wherein the main body extends directly downward to a first area of a hemispherical portion of the protrusion, wherein a second area of the hemispherical portion extends upward into a rectangular portion adjacent to the main body such that the spreader is secured inside the container.

6. The food spreading system of claim 5, wherein the lid is attached to the spreader by a suction cup.

7. The food spreading system of claim 5, wherein the lid is attached to the spreader by foam tape.

8. The food spreading system of claim 5, wherein the protrusion is made of a flexible material.

9. The food spreading system of claim 8, wherein the main body is made of a rigid material.

10. The food spreading system of claim 8, wherein the protrusion is made of silicone.

* * * * *